Figure 1:
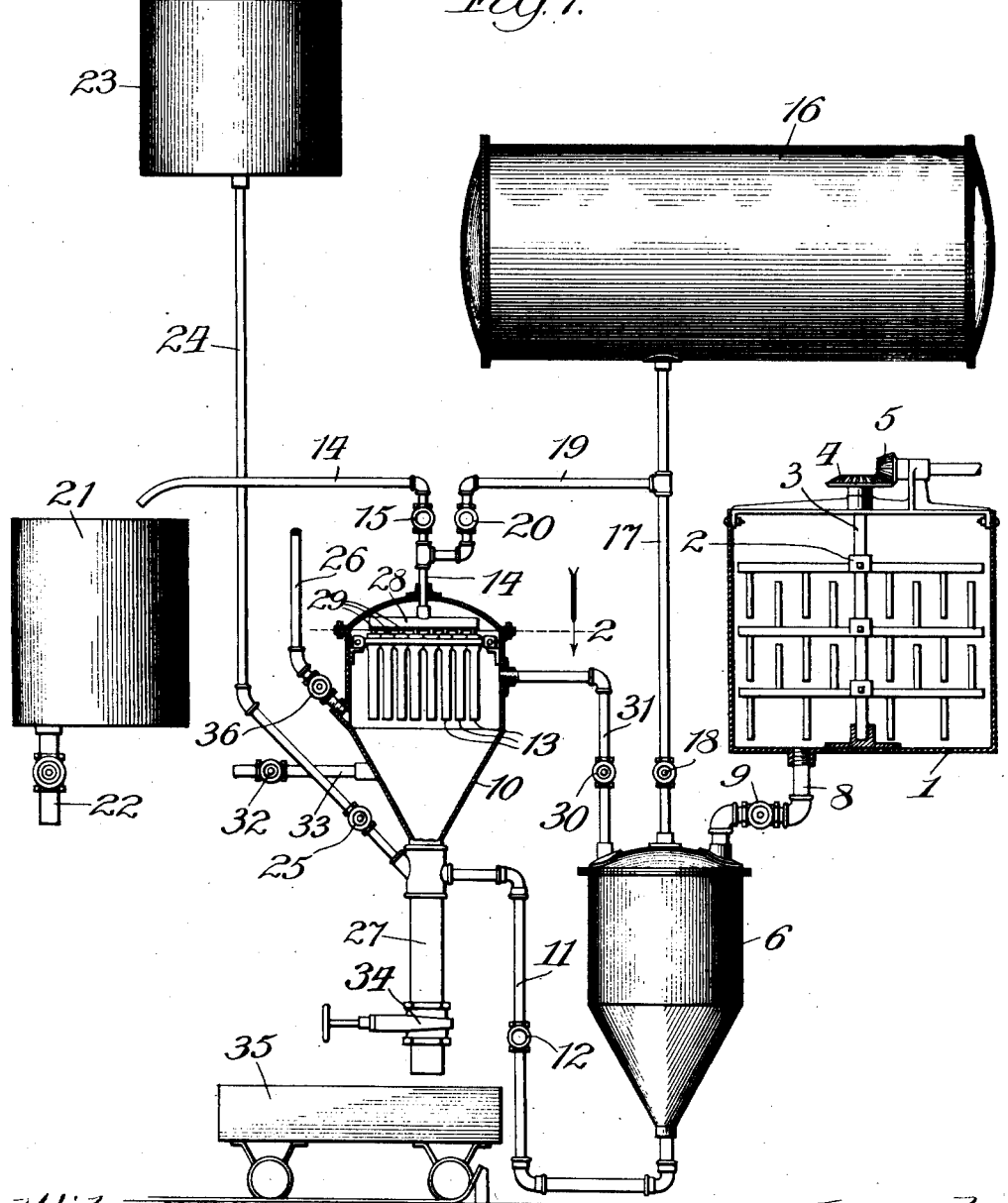

No. 826,390. PATENTED JULY 17, 1906.
C. W. VAN LAW.
APPARATUS FOR TREATING SLIMES.
APPLICATION FILED JULY 15, 1904.

2 SHEETS—SHEET 1.

Witnesses:
Chas. C. Gaylord.
John Enders.

Inventor,
Carlos W. Van Law,
By Thomas F. Sheridan,
Atty.

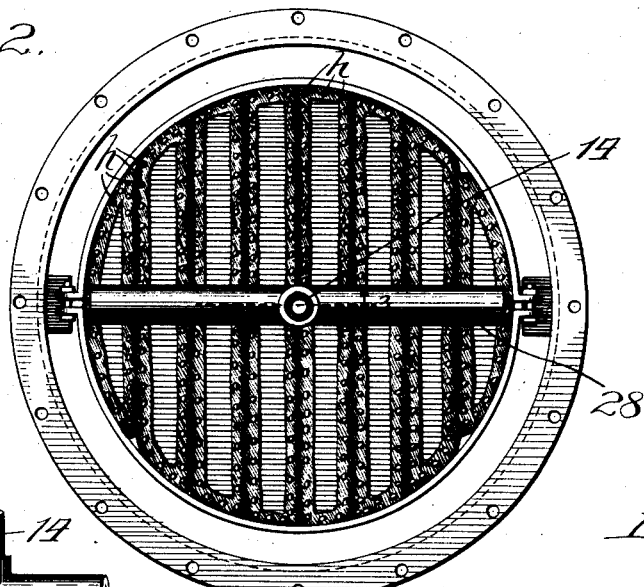
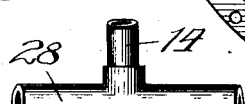
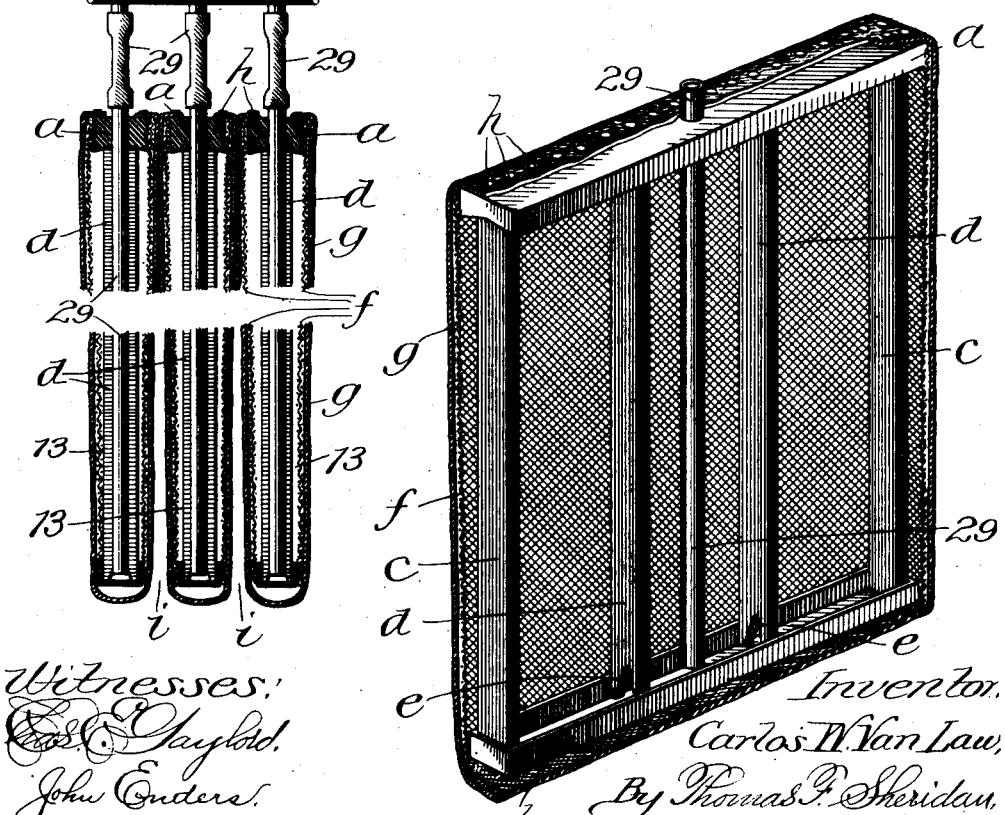

UNITED STATES PATENT OFFICE.

CARLOS W. VAN LAW, OF GUANAJUATA, MEXICO.

APPARATUS FOR TREATING SLIMES.

No. 826,390.　　　　Specification of Letters Patent.　　　Patented July 17, 1906.

Application filed July 15, 1904. Serial No. 216,720.

*To all whom it may concern:*

Be it known that I, CARLOS W. VAN LAW, a citizen of the United States, residing at Guanajuata, Mexico, have invented certain new and useful Improvements in Apparatus for Treating Slimes, of which the following is a specification.

This invention relates to that class of apparatus which is adapted for the treatment of valuable mineral-bearing slimes, and particularly to an apparatus for filtering the same, so as to remove the solid materials therefrom, all of which will more fully hereinafter appear.

The principal object of the invention is to provide a simple, economical, and efficient apparatus for the filtering of slimes.

Other and further objects of the invention will appear from an examination of the drawings and the following description and claims.

The invention consists principally in an apparatus in which there are combined a filtering-tank, a hollow filter in said tank, means for subjecting the liquid slimes in said tank to a fluid-pressure exterior to the filter to force the liquids therethrough, and means for subjecting the interior of the filter to air under pressure to disconnect the filtering material from the exterior.

The invention consists, further and finally, in the features, combinations, and details of construction hereinafter described and claimed.

In the accompanying drawings, Figure 1 is a diagrammatic view of a system of apparatus for treating slimes as it appears when constructed in accordance with these improvements; Fig. 2, an enlarged plan view of the filtering unit, taken on line 2 of Fig. 1; Fig. 3, a sectional detail taken on line 3 of Fig. 2 looking in the direction of the arrow; and Fig. 4, a perspective view of one of the filter-frames hereinafter described.

In the art to which this invention relates it is highly desirable to filter the values from slimes, and to provide an apparatus therefor which will economically and efficiently recover the values contained in such slimes is the principal object of this invention.

In constructing an apparatus in accordance with these improvements I provide a slime-supply tank 1, which has agitating mechanism 2 contained therein. The agitating mechanism is revolubly mounted upon a shaft 3, arranged to be operated by bevel-gear and pinion mechanism 4 and 5. I next provide what I term a "slime-pressure tank" 6, which is connected with the slime-supply tank by means of a pipe 8, having a valve 9 therein, which valve may be operated to open and close said pipe whenever it becomes necessary or desirable so to do. I next provide a filter-tank 10 and arrange it at a higher level than the slime-pressure tank. This filter-tank, as well as the slime-pressure tank, is preferably provided with hopper-bottom portions to more efficiently assist in the discharge of materials therein. A pipe 11 is provided, which connects the hopper-bottom of the slime-pressure tank with the hopper-bottom of the filter-tank and in turn is provided with a valve 12, which can be operated to open and close said pipe, and thereby provide for a connection and disconnection between such tanks.

To filter the material whenever it is desirable or necessary, a hollow filter or battery of filters 13 is provided, which will be more fully hereinafter described, and the interior of said filter is connected with a discharge-pipe 14, having a valve 15 therein, which valve may be opened and closed, as desired, to permit the filtered liquid to be discharged from the interior of the filter. An air-reservoir 16 is also provided in which air under any desired pressure may be stored to be used as required. A pipe 17 is provided and connected with this air-reservoir and with the upper part of the slime-pressure tank, having a valve 18 to open and close said connections. A branch pipe 19 is provided, connected with the pipe 17, leading from the air-pressure tank to the discharge-pipe 14, so that air under pressure whenever it is desirable or necessary to use it may be furnished to the interior of the filter. This pipe is also provided with a valve 20, which may be opened and closed whenever it is desirable or necessary so to do.

A recovery-tank 21 is provided to receive the valuable solution as it is discharged from the filter, and such valuable solution may be discharged through a valved pipe 22 whenever required and carried back to the slime-supply tank or to such other tank as may be necessary to re-treat the same.

What I prefer to term a "standard tank" 23 is provided and connected by means of a pipe 24, having a valve 25 therein, with the lower part of the filter-tank. This standard tank may be used to hold cleansing or other chemical liquids, which may be used as required for the further treatment of the filtered material, as will more fully hereinafter appear. A valved flushing-pipe 26 is provided and connected with a suitable source of water-supply and the hopper-bottom of the filtering-tank to flush the same whenever it may be desirable so to do. A valved material-discharging pipe 27 is also provided, connected with the hopper-opening of the filter-tank and through which the broken caked materials may be discharged whenever desirable, as will more fully hereinafter appear.

Describing the filter or battery of filters, one of which is shown in Fig. 4, it consists of a plurality of frames bound together, each frame being made in the form of a skeleton having an upper bar $a$ and a lower channeled bar $b$, connected together by a plurality of vertical connecting-bars $c$ and $d$, the central connecting-bars being grooved, as at $e$, at the lower edge, so as to permit the liquid to pass under the same from each end of the channeled bar to the center thereof. The discharge-pipe 14 is provided with a branch pipe 28, Fig. 3, having a plurality of pipes 29, one of which extends down through each filter-frame to the bottom thereof and into the channel-bar at the bottom thereof. Wire mesh $f$ is tacked around or otherwise secured to each filter-frame, and around this filter-frame with its inclosing wire mesh is arranged an enveloping canvas sack $g$, which is tacked to the upper bar $a$, as at $h$. A plurality of these frames, as shown in Figs. 2 and 3, are secured together—that is, laid side by side—those at the center being broader than those at the ends. It will be noticed, however, that considerable space, as at $i$, is left between the individual members of the combined filter unit, which spaces are sufficient for the building up of the cake of filtering material and the subsequent disconnection of the same, as will more fully hereinafter appear.

In operation slime is drawn from the supply-tank and allowed by force of gravity to enter the slime-pressure tank until such tank has the desired amount of material stored therein to perform one treating operation. The valve 9 is then closed, it being understood that all of the other valves are also closed at the start of the operation. Valves 12, 15, and 18 are then opened, so that air under pressure enters at the upper part of the slime-pressure tank and acts to force the slime into the filter-tank by gradually forcing the liquid therein through the filtering unit and out through its discharge-pipe 14 into the recovery-tank 21, the solid material becoming gradually caked on the enveloping canvas sacks of the filter-frames. This process is continued until all of the slime that it is possible to treat in the slime-pressure tank has been forced through the filter. When this has been performed, the valve 30 in the equalizing-pipe 31 is opened, which permits air in the slime-pressure tank to enter the filtering-tank and equalize the pressure in both of such tanks, so that whatever untreated slimes remain in the filter-tank will flow back by force of gravity into the slime-pressure tank, leaving the filter suspended in an atmosphere of compressed air. This action, the valves 15 and 18 being still open, forces a quantity of the compressed air through the caked material on the filtering unit to assist in drying and treating the same.

Should it be desired to further treat the caked material on the filtering unit, the valve 12 is closed and the valve 25 on the pipe 24 of the standard tank opened to furnish a supply of cleansing liquid, such as ordinarily used in the treatment of slimes, the pressure of the compressed air in the tank being sufficient to force such cleansing liquid through the filter, as in the case of the slimes from the slime-pressure tank. Any such liquids introduced will be forced through the filtered cake and out through pipe 14 into the recovery-tank or to some other tank if it be desired to keep the solution separate.

When it is desirable to discharge the finished cake from the filter, all that it is necessary to do is to close all of the valves and open the valve 32 on the air-discharge pipe 33 to permit the air under pressure to be exhausted from the filter-tank. The valve 20 is then opened, which connects the interior of the filter with the air-reservoir. Air will then flow through the filter, so as to expand the canvas sacks, thereby breaking the caked material on the exterior of the same, so that it falls into the hopper-bottom of the filter-tank, from which it may be discharged by opening the large gate-valve 34 on the material-discharge pipe 27 into the car 35.

Should it be desirable at any time so to do, all of the valves may be closed, with the exception of valve 34, and the valve 36 on the flushing-pipe 26 may be opened, which furnishes a supply of clean water to the filtering-tank to flush and cleanse the same.

I claim—

1. In an apparatus of the class described, the combination of a filtering-tank and a slimes-pressure tank, means for forcing slimes from the pressure-tank to the filtering-tank and through the filter by air at pressure above normal, means for equalizing the pressure in the tanks, and means for subjecting the interior of the filter to air at pressure above normal.

2. In an apparatus of the class described, the combination of a filter-tank, a slime-pressure tank connected therewith, a hollow filter in said tank, and an air-reservoir connected with the slimes-pressure tank and with the interior of the filter for subjecting both sides of the filter to air under artificial pressure, substantially as described.

3. In an apparatus of the class described, the combination of a filter-tank, a slimes-pressure tank connected at its upper and lower sides with the filter-tank, a filter in the filtering-tank, a discharge-pipe connected with the interior of the filter, and an air-reservoir connected with the upper part of the slimes-pressure tank and the interior of the filter for subjecting both sides of the filter to air under artificial pressure, substantially as described.

4. In an apparatus of the class described, the combination of a filter-tank provided with a hopper-bottom, a slimes-pressure tank provided with a hopper-bottom, a valved pipe connecting the hopper-bottom of the slimes-pressure tank with the hopper-bottom of the filter-tank, a valved pipe connecting the upper part of the slimes-pressure tank with the filter-tank for equalizing the pressures therein, a hollow filter in the filter-tank, a valved discharge-pipe connected with the interior of the hollow filter, an air-reservoir, and valved pipe mechanism connecting the air-reservoir with the upper part of the slimes-pressure tank and the interior of the filter, substantially as described.

5. In an apparatus of the class described, the combination of a filter-tank provided with a hopper-bottom, a slimes-pressure tank provided with a hopper-bottom, a valved pipe connecting the hopper-bottom of the slimes-pressure tank with the hopper-bottom of the filter-tank, a valved pipe connecting the upper part of the slimes-pressure tank with the filter-tank for equalizing the pressures therein, a hollow filter in the filter-tank, a valved discharge-pipe connected with the interior of the hollow filter, an air-reservoir, valved pipe mechanism connecting the air-reservoir with the upper part of the slimes-pressure tank and the interior of the filter, and a valved air-discharge pipe connected with the filter-tank for exhausting the air under pressure therefrom, substantially as described.

6. In a system for treating slimes, the combination of a filter-tank provided with a hopper-bottom, a slimes-pressure tank provided with a hopper-bottom, a valved pipe connecting the hopper-bottom of the slimes-pressure tank with the hopper-bottom of the filter-tank, a slime-supply tank provided with agitating mechanism, a valved pipe connecting the slime-supply tank with a slimes-pressure tank, a hollow filter in the filter-tank, a valved discharge-pipe connected with the interior of the filter, an air-reservoir, valved pipe mechanism connecting the air-reservoir with the interior of the filter and with the upper part of the slimes-pressure tank, and a valved pipe connecting the upper part of the slimes-pressure tank with a chamber of the filter-tank to equalize the pressures therein, substantially as described.

7. In a system for treating slimes, the combination of a filter-tank provided with a hopper-bottom, a slimes-pressure tank provided with a hopper-bottom, a valved pipe connecting the hopper-bottom of the slimes-pressure tank with the hopper-bottom of the filter-tank, a slime-supply tank provided with agitating mechanism, a valved pipe connecting the slime-supply tank with a slime-pressure tank, a hollow filter in the filter-tank, a valved discharge-pipe connected with the interior of the filter, an air-reservoir, valved pipe mechanism connecting the air-reservoir with the interior of the filter and with the upper part of the slimes-pressure tank, a valved pipe connecting the upper part of the slimes-pressure tank with a chamber of the filter-tank to equalize the pressures therein, and a valved material-discharge pipe connected with the hopper-opening in the hopper-bottom of the filter-tank, substantially as described.

8. In a system for treating slimes, the combination of a filter-tank provided with a hopper-bottom, a slimes-pressure tank provided with a hopper-bottom, a valved pipe connecting the hopper-bottom of the slimes-pressure tank with the hopper-bottom of the filter-tank, a slime-supply tank provided with agitating mechanism, a valved pipe connecting the slime-supply tank with a slimes-pressure tank, a hollow filter in the filter-tank, a valved discharge-pipe connected with the interior of the filter, an air-reservoir, valved pipe mechanism connecting the air-reservoir with the interior of the filter and with the upper part of the slimes-pressure tank, a valved pipe connecting the upper part of the slimes-pressure tank with a chamber of the filter-tank to equalize the pressures therein, a valved material-discharge pipe connected with the hopper-opening in the hopper-bottom of the filter-tank, a valved pipe connected with a source of water-supply for flushing and cleansing the filtering-tank, and an air-exhaust pipe connected with the filtering-tank for exhausting air under pressure therefrom, substantially as described.

9. In an apparatus of the class described, the combination of filter mechanism, a tank in which such filter mechanism is arranged provided with passages communicating, respectively, with the space on opposite sides of the filter mechanism, and means for forcing fluid under pressure into such tank on opposite sides of such filter mechanism alternately, a liquid-containing receptacle inside of such filter and a pipe extending inside the filter and into such liquid-containing receptacle for discharging liquid from inside of the filter, substantially as described.

10. In an apparatus of the class described, the combination of a hollow filter provided with a passage opening upon the inside thereof, a liquid-containing channel mounted inside of the lower portion of such filter with which such passage communicates, a tank in which such filter is arranged provided with a passage communicating with the space in the tank outside of the filter, means for opening and closing such passages, means for forcing fluid under pressure into the tank on the outside of the filter while the passage on the inside of such filter is open, and means for forcing fluid under pressure through the passage opening upon the inside of the filter while the passage on the outside of such filter is open, substantially as described.

11. In an apparatus of the class described, the combination of a hollow filter provided with a pipe opening upon the inside thereof, a liquid-containing channel inside of such filter into which such pipe extends, a tank in which such filter is arranged provided with a passage communicating with the space in the tank outside of the filter and a passage opening upon the inside of such filter, means for opening and closing such passages, means for forcing slimes under pressure into the tank on the outside of the filter while the passage on the inside of such filter is open, and means for forcing fluid under pressure through the passage opening upon the inside of the filter while the passage on the outside of such filter is open, substantially as described.

CARLOS W. VAN LAW.

Witnesses:
THOMAS F. SHERIDAN,
ANNIE C. COURTENAY.